US007561535B2

(12) United States Patent
Naqvi et al.

(10) Patent No.: US 7,561,535 B2
(45) Date of Patent: *Jul. 14, 2009

(54) SYSTEM AND METHOD FOR PROVIDING DYNAMIC CALL MODELS FOR USERS AS FUNCTION OF THE USER ENVIRONMENT IN AN IMS NETWORK

(75) Inventors: Shamim A. Naqvi, Boston, MA (US); Prasad S. Dorbala, Lexington, MA (US); Mahesh N. Ganmukhi, Carlisle, MA (US); Ellis L. Wong, Lexington, MA (US)

(73) Assignee: Aylus Networks, Inc., Westford, MA (US)

( * ) Notice: Subject to any disclaimer, the term of this patent is extended or adjusted under 35 U.S.C. 154(b) by 428 days.

This patent is subject to a terminal disclaimer.

(21) Appl. No.: 11/166,470

(22) Filed: Jun. 24, 2005

(65) Prior Publication Data

US 2006/0291437 A1  Dec. 28, 2006

(51) Int. Cl.
*H04Q 11/00* (2006.01)
*H04L 12/16* (2006.01)
*H04L 5/14* (2006.01)
*H04H 20/71* (2008.01)

(52) U.S. Cl. .................. 370/260; 370/352; 370/312

(58) Field of Classification Search .............. 370/260, 370/352, 312
See application file for complete search history.

(56) References Cited

U.S. PATENT DOCUMENTS 4,736,407 A   4/1988  Dumas
6,018,662 A   1/2000  Periyalwar et al.
6,032,053 A   2/2000  Schroeder et al.
6,374,112 B1  4/2002  Widegren et al.
6,574,326 B1  6/2003  Wong et al.
6,608,832 B2  8/2003  Forslow
6,888,828 B1* 5/2005  Partanen et al. ............. 370/389
6,950,655 B2  9/2005  Hunkeler et al.

(Continued)

FOREIGN PATENT DOCUMENTS

EP          1435748          7/2004

*Primary Examiner*—Vincent P Harper
*Assistant Examiner*—Marisol Figueroa
(74) *Attorney, Agent, or Firm*—Wilmer Cutler Pickering Hale and Dorr LLP (57) ABSTRACT

Systems and methods for providing dynamic call models for users in an IMS network. A system and method provisions dynamic call models within an IMS network having a serving call state control function (S-CSCF) for providing session control for user endpoint (UE) devices. At least one user endpoint device (UE) with agent logic, expresses dynamic context of the UE in a message and sends said dynamic context message to a S-CSCF, wherein said dynamic context includes at least a subset of devices that could be used as UEs or associated devices, network connections that terminate or emanate from said devices that could be used as UEs or associated devices, and capabilities of said devices that could be used as UEs or associated devices. S-CSCF logic receives said context message from the UE and constructs a dynamic call model in response thereto, said dynamic call model having filter codes to associate IMS service codes with application servers (ASs) in communication with the IMS network, said ASs being responsive to service point triggers (SPTs) and each AS having service logic to provide a service for a corresponding IMS service code.

40 Claims, 9 Drawing Sheets

U.S. PATENT DOCUMENTS

| | | |
|---|---|---|
| 7,301,938 B2 | 11/2007 | Ejzak |
| 2002/0140726 A1 | 10/2002 | Schwartz et al. |
| 2002/0181462 A1 | 12/2002 | Surdila et al. |
| 2003/0026245 A1 | 2/2003 | Ejzak |
| 2003/0027569 A1 | 2/2003 | Ejzak |
| 2003/0027595 A1 | 2/2003 | Ejzak |
| 2003/0055974 A1 | 3/2003 | Brophy et al. |
| 2003/0134636 A1 | 7/2003 | Sundar et al. |
| 2004/0008669 A1 | 1/2004 | Bos et al. |
| 2004/0019539 A1 | 1/2004 | Raman et al. |
| 2004/0043766 A1 | 3/2004 | Sashihara |
| 2004/0068574 A1 | 4/2004 | Costa Requena et al. |
| 2004/0076145 A1 | 4/2004 | Kauhanen et al. |
| 2004/0083195 A1 | 4/2004 | McCord et al. |
| 2004/0162892 A1 | 8/2004 | Hsu |
| 2004/0193700 A1 | 9/2004 | Westman et al. |
| 2004/0219912 A1 | 11/2004 | Johansson et al. |
| 2004/0249887 A1 | 12/2004 | Garcia-Martin et al. |
| 2004/0249962 A1 | 12/2004 | Lecomte |
| 2004/0252673 A1 | 12/2004 | Ejzak et al. |
| 2004/0261116 A1 | 12/2004 | Mckeown et al. |
| 2005/0025163 A1 | 2/2005 | Christie |
| 2005/0043020 A1* | 2/2005 | Lipsanen et al. ......... 455/422.1 |
| 2005/0047399 A1 | 3/2005 | Lee et al. |
| 2005/0050194 A1 | 3/2005 | Honeisen et al. |
| 2005/0058125 A1 | 3/2005 | Mutikainen et al. |
| 2005/0083909 A1 | 4/2005 | Kuusinen et al. |
| 2005/0089020 A1 | 4/2005 | Ahlback et al. |
| 2005/0190772 A1 | 9/2005 | Tsai et al. |
| 2005/0213606 A1 | 9/2005 | Huang et al. |
| 2005/0227681 A1 | 10/2005 | Li |
| 2005/0237933 A1 | 10/2005 | Marjelund et al. |
| 2005/0243870 A1 | 11/2005 | Balogh et al. |
| 2005/0245261 A1 | 11/2005 | Ejzak |
| 2005/0271011 A1 | 12/2005 | Alemany et al. |
| 2005/0286531 A1 | 12/2005 | Tuohino et al. |
| 2006/0015812 A1 | 1/2006 | Cunningham et al. |
| 2006/0025151 A1 | 2/2006 | Karaoguz et al. |
| 2006/0083199 A1 | 4/2006 | Yang |
| 2006/0114987 A1 | 6/2006 | Roman |
| 2006/0120287 A1 | 6/2006 | Foti et al. |
| 2006/0140150 A1 | 6/2006 | Olvera-Hernandez et al. |
| 2006/0155814 A1 | 7/2006 | Bennett et al. |
| 2006/0164550 A1 | 7/2006 | Yoshimoto et al. |
| 2006/0209768 A1 | 9/2006 | Yan et al. |
| 2006/0246903 A1 | 11/2006 | Kong et al. |
| 2006/0258394 A1 | 11/2006 | Dhillon et al. |
| 2006/0262806 A1 | 11/2006 | Bouazizi |
| 2006/0291412 A1 | 12/2006 | Naqvi et al. |
| 2006/0291419 A1 | 12/2006 | McConnell et al. |
| 2006/0291437 A1 | 12/2006 | Naqvi et al. |
| 2006/0291484 A1 | 12/2006 | Naqvi et al. |
| 2006/0291487 A1 | 12/2006 | Naqvi et al. |
| 2006/0291488 A1 | 12/2006 | Naqvi et al. |
| 2006/0291489 A1 | 12/2006 | Naqvi et al. |
| 2006/0294244 A1 | 12/2006 | Naqvi et al. |
| 2007/0008913 A1* | 1/2007 | Naqvi et al. ................ 370/260 |
| 2007/0008951 A1* | 1/2007 | Naqvi et al. ................ 370/352 |
| 2007/0014281 A1 | 1/2007 | Kant |
| 2007/0033286 A1 | 2/2007 | Min |
| 2007/0053343 A1 | 3/2007 | Suotula et al. |
| 2007/0066347 A1 | 3/2007 | Silverbrook et al. |
| 2007/0067807 A1 | 3/2007 | O'Neil |
| 2007/0197227 A1 | 8/2007 | Naqvi et al. |
| 2007/0217349 A1 | 9/2007 | Fodor et al. |
| 2008/0043717 A1 | 2/2008 | Bellora et al. |

* cited by examiner

SYSTEM AND METHOD FOR PROVIDING DYNAMIC CALL MODELS FOR USERS AS FUNCTION OF THE USER ENVIRONMENT IN AN IMS NETWORK

BACKGROUND

1. Field of the Invention

The invention generally relates to IP Multimedia Subsystem (IMS) networks and, more specifically, to IMS networks with dynamic call models.

2. Discussion of Related Art

Commonly deployed wireless communication networks, usually referred to as 2.5G networks, support both voice and data services. Typically, mobile handsets are connected to a Base Transceiver Station (BTS) using a Radio Access Network (RAN) that uses a modulation scheme such as CDMA (Code Division Multiple Access) or GSM (Global System for Mobile communications). The BTSs are connected via fixed links to one or more Base Station Controller (BSC) and the BSCs are aggregated into switches called Mobile Switching Centers (MSCs). The MSC is connected to the Public Land Mobile Network/Public Switched Telephone Network (PLMN/PSTN), typically through a gateway switch called the Gateway Mobile Switching Center (GMSC). Sometimes the term "core network" is used to collectively describe the MSC, GMSC and associated network elements. Voice traffic uses the so called circuit switched paradigm of communications in which circuits are assigned, i.e., dedicated, to a call for its entire duration; the voice traffic is carried using Time Division Multiplexing (TDM) switching technology. Signaling traffic uses Signaling System 7 (SS7) typically as out of band circuits.

With the advent of Internet Protocol (IP) networking, IP data service is offered to wireless clients by an overlay data network in which a packet control function (PCF) is introduced at the BSC level to connect BSCs to an IP-routed network. The PCF is responsible for packetization of RAN traffic. On the inbound side (core network to RAN) the PCF takes IP packets and reorganizes them for transmission as frames over the radio transport protocol. On the outbound side (RAN to core network) the PCF packetizes radio protocol frames to IP packets. Data connections are handled by this overlay network and the MSC is used primarily to handle circuit switched voice calls.

The development of Voice over IP (VoIP) technology has resulted in the MSC being re-designed to handle packet switched voice traffic along with existing circuit switched traffic. This new architecture is called a soft switch network. The legacy switch is disaggregated into a control and multiplicity of media gateway (MGW) components. The control component (sometimes called the soft switch) uses an open control protocol called the Media Gateway Control Protocol (MGCP) to manage the MGW. The MGW itself has the ability to accept both packet and circuit switched traffic and convert one to the other, under the control of the soft switch. It is thus possible in 2.5G networks to carry both circuit switched and packet switched traffic.

It is widely believed that wireless communications will soon be dominated by multimedia services. This has resulted in new RAN technologies and the resulting networks are called 3G networks. The transition of 2.5G to 3G networks emphasizes packet traffic and new architectures have been proposed to handle multimedia sessions, such as Quality of Service (QoS).

A defining characteristic of 2.5G/3G multimedia services is that since the handset can send or receive IP data packets at any time, the IP context of the handset is maintained as long as the handset is powered on and connected to the network. This is in contrast to traditional telephony where the state of a connection is maintained only while a telephone call is in progress.

In particular, in 3G networks the services are to be provided by so-called Application Servers. Consequently the connection between the service logic and the application server is a "stateful" connection that needs to be maintained for the duration of the service being used. Hence a very large number of stateful connections need to be maintained between the application server complex, hosted in the application domain, and the service logic complex hosted in the service logic domain, in a network servicing a large number of subscribers. Such stateful connections that cross administrative domains have high networking costs and are difficult to maintain operationally.

Figure 1:
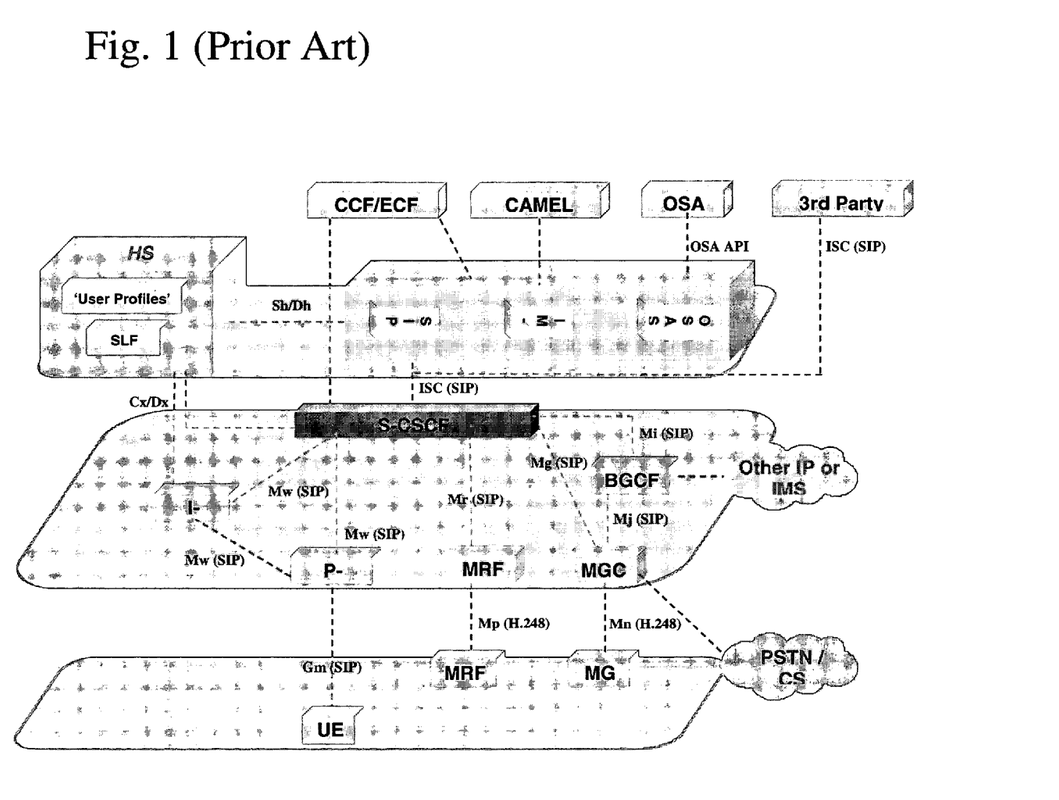
FIG. 1 depicts a prior art IMS network.

Typical of proposals for 3G network architecture is the IP Multimedia Subsystem (IMS) architecture, shown in FIG. 1, that uses Session Initiation Protocol (SIP) for control and signaling messages. SIP is an IP-based signaling protocol designed for multimedia communications. The IMS architecture introduces several control functions, i.e., functional entities, to manage the network. The legacy circuit switched traffic is handled by an Inter-working Function called the BGCF (Breakout gateway control function). The MGW is controlled by a new function called the Media Gateway Control Function (MGCF), and the media processing functions are performed by the Media Resource Function Processor (MRFP), which is controlled by the Media Resource Control Function (MRFC).

The basic call server called the Call State Control Function (CSCF) is logically partitioned into three functional entities, the Proxy, Interrogating and Serving CSCF.

The Proxy Call State Control Function (P-CSCF) is the first contact point for the handset, also referred to herein as the User Entity (UE,) within IMS and provides the following functions:

1. Forward SIP register request received from the UE
2. Forward SIP messages received from the UE to the SIP server
3. Forward the SIP request or response to the UE
4. Detect and handle an emergency session establishment request
5. Generate Call Detail Records (CDRs)
6. Maintain Security Association between itself and each UE
7. Perform SIP message compression/decompression
8. Authorize bearer resources and QoS management The Interrogating CSCF (I-CSCF) is mainly the contact point within an operator's network for all IMS connections destined to a subscriber of that network operator, or a roaming subscriber currently located within that network operator's service area. It provides the following functions:

1. Assign a S-CSCF to a user performing SIP registration
2. Route a SIP request received from another network towards the S-CSCF
3. Obtain from Home Subscriber Server (HSS) the Address of the S-CSCF
4. Forward the SIP request or response to the S-CSCF as determined above
5. Generate CDRs The Serving CSCF (S-CSCF) actually handles the session states in the network and provides the following functions:

1. Behave as SIP Registrar: accept registration requests and make its information available through the location server 2. Session control for the registered endpoints' sessions
3. Behave as a SIP Proxy Server: accept requests and service them internally or forward them on
4. Behave as a SIP User Agent: terminate and independently generate SIP transactions
5. Interact with application servers for the support of Services via the IMS Service Control (ISC) interface
6. Provide endpoints with service event related information
7. Forward SIP message to the correct CSCF
8. Forward the SIP request or response to a BGCF for call routing to the PSTN or CS Domain
9. Generate Call Detail Records.

The P-CSCF is the first point of contact for a UE (handset) in an IMS network. The I-CSCF then helps in establishing which S-CSCF "owns" the UE.

Figure 2:
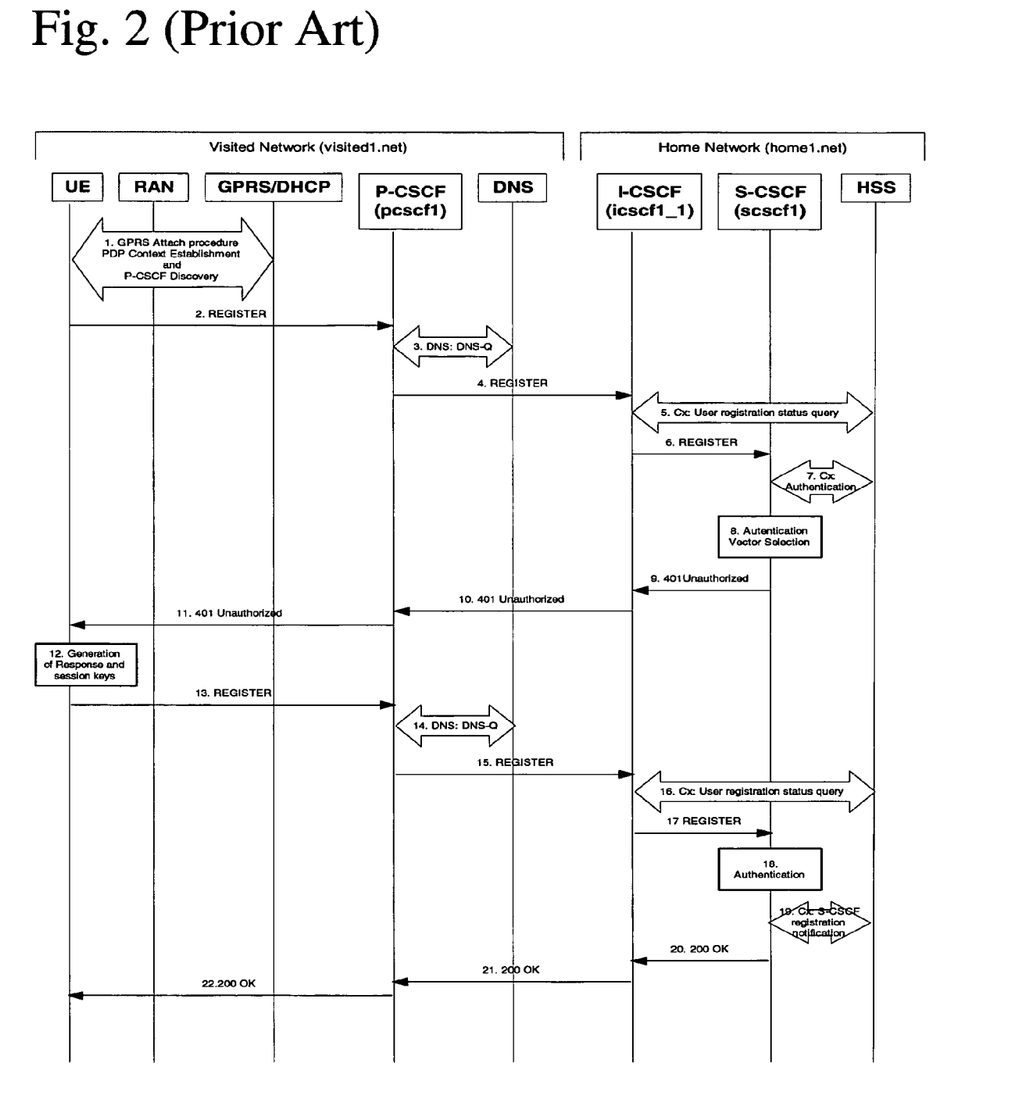
FIGS. 2 and 3 are signal diagrams for a prior art IMS network.

FIG. 2 is a signaling diagram 200, showing the call flow for a UE when it first establishes contact with an IMS network. The UE sends a "register" request to the proxy. Assuming the proxy determines that the UE is registering from a visiting domain, it queries the DNS to find the I-CSCF in the UE's home domain. The proxy then sends the registration information to the I-CSCF. The HSS checks if the user is already registered and sends the address of the S-CSCF in response. An authentication process now ensues in which the UE is challenged to provide valid authentication vectors. Once the authentication procedure is completed, the S-CSCF informs the HSS that the UE is registered.

The HSS provides initial filter codes (IFCs) to the S-CSCF. The IFC, in effect, maps the service codes with various application servers (ASs). Thus, if the UE later issues a service request or if the service is otherwise triggered the mapped AS will be invoked. The IFC is effectively the "call model" for the UE. These call models are static objects downloaded during registration from the HSS. Every UE in the domain of the S-CSCF will, if they have the services enabled at all, have the same application servers (ASs) mapped to the same services. For example, push-to-talk service for each and every UE having such service will point to the same AS or point to an AS with identical service logic to provide the identical push-to-talk functionality.

Figure 3:
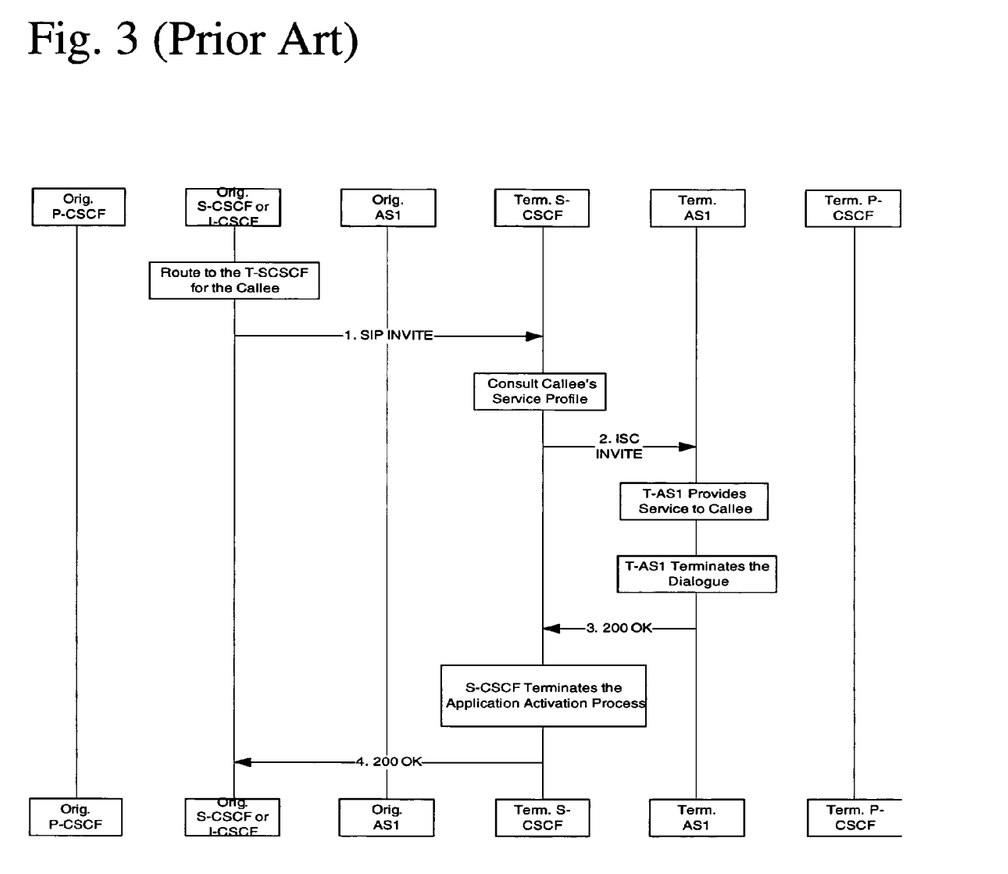

Registered UEs may use services by initiating a new session establishment procedure depicted in FIG. 3. The figure shows a session establishment request originating with a S-CSCF (called O-SCSCF) or I-CSCF (called O-ICSCF). This request is routed to the "terminating" S-CSCF (T-SC-SCF), which consults the callee's service profile. Based on the service profile of the originating registered user, the T-SC-SCF sends an IMS service control request (ISC) to the corresponding application server (T-AS) that can handle this service request. The T-AS provides the service to the callee and terminates the session and the S-CSCF terminates the application activation process.

As an illustrative example, consider the case of voice mail in which callers to a certain user may leave a voice message if the called user does not respond to the call. This voice mail service is provided by an application server (AS) dedicated to this service and having service logic to provide such functionality. The S-CSCF transfers control to the voice mail application server when a certain service point trigger (SPT) occurs, i.e., an event occurs that causes a trigger within the SPT to "fire." The IFCs that provide trigger points to the service logic of the S-CSCF are downloaded into the S-CSCF during user registration at session initiation time and remain fixed for the duration of the session. The service profile described above that is consulted by the T-SCSCF is a static object in the sense that the information contained in it is defined once at the time of service inception.

Since government regulations restrict use of the electromagnetic spectrum to license holders, such license holders have traditionally been the only organizations to offer wireless services. However, the industry has recently seen the advent of Mobile Virtual Network Operators (MVNOs) that use the license holder's underlying network facilities to offer services. In essence, this is a business agreement that allows the MVNO to use the network operator's facilities without owning the network infrastructure or spectrum license. Thus, wireless services can be offered by several MVNOs (as virtual service providers) using the same underlying network infrastructure. One problem with such an arrangement is that service differentiation is not possible amongst the various MVNOs. Thus, if two MVNOs, MVNO1 and MVNO2, both provide voice service, that service will be indistinguishable to end users of the voice service.

The service that is offered on a 3G network is determined by the service logic that is executed by the network infrastructure. In prior art systems, the service logic is executed by the network infrastructure, i.e., the network facilities and equipment. Therefore, all users of the network are tied to the same service logic, namely that of the network infrastructure, and consequently are constrained to offer the same service experience. In the example referred to above, MVNO1 and MVNO2 are both tied to the service logic provided by the network infrastructure, and they are not able to differentiate their services. Even though the customer base can be distinguished by the network infrastructure, for example for billing purposes, the service characteristics for all customers cannot be distinguished unless different service logic is executed for different sets of users.

SUMMARY

The invention provides systems and methods for providing dynamic call models for users in an IMS network.

Under one aspect of the invention a system and method provisions dynamic call models within an IMS network having a serving call state control function (S-CSCF) for providing session control for user endpoint (UE) devices. At least one user endpoint device (UE) with agent logic expresses dynamic context of the UE in a message and sends the dynamic context message to a S-CSCF. The dynamic context includes at least a subset of devices that could be used as UEs or associated devices, network connections that terminate or emanate from the devices that could be used as UEs or associated devices, and capabilities of the devices that could be used as UEs or associated devices. S-CSCF logic receives the context message from the UE and, in response, constructs a dynamic call model that has filter codes to associate IMS service codes with application servers (ASs) in communication with the IMS network, the ASs being responsive to service point triggers (SPTs) and each AS having service logic to provide a service for a corresponding IMS service code.

Under another aspect of the invention, the logic to construct a dynamic call model includes logic to consult and use specified service policies in constructing the dynamic call models.

Under another aspect of the invention, the specified service policies govern use of newly discovered devices and new network connections.

Under another aspect of the invention, the specified service policies are specified and implemented by a service provider to control which devices may be used for which type of services for specified conditions.

Under another aspect of the invention, logic builds a data structure to reflect the dynamic context for the UE.

Under another aspect of the invention, the UE includes logic to electronically sense the dynamic context.

Under another aspect of the invention, the electronic sensing logic operates continuously.

Under another aspect of the invention, the electronic sensing logic operates periodically or at specified times.

Under another aspect of the invention, the electronic sensing logic operates on demand.

Under another aspect of the invention, the logic to construct a dynamic call model builds a new call model to replace a prior call model for a user.

Under another aspect of the invention, the logic to construct a dynamic call model builds new filter codes and pushes the new filter codes on top of the prior call model for a user.

DETAILED DESCRIPTION

According to preferred embodiments of the invention, IMS call models may be created and used dynamically on a per user basis. Thus, a first user may have specific service logic associated with a given service request (via the first user's call model), and a second user may have different service logic associated with the same service request (via the second user's call model). In this fashion, each user's service logic may be distinct, and each user's "service experience" may thus be distinct.

This dynamic call model feature may be exploited in many new and interesting ways. For example, the IMS network may be configured so that an MVNO or VSO can "exist" deeper in an IMS infrastructure (e.g., at an CSCF and application layer), and so that an MVNO or VSO may provide distinctive service (not just branding) to their customers. Alternatively, a given network operator may exploit this feature so that they can logically divide the IMS control plane to correspond to different user groups. The different user groups may have distinctive service logic (and thus service experience) for the same set of services. In addition, the dynamic call model may change during a call. In this way, the call model may adapt to the user's context and utilize different capabilities and associated devices that become available to a user during a session or because the cost function for delivery for alternative delivery means may change during a session.

Certain embodiments reduce or minimize the cost of stateful connections between application servers and S-CSCFs. Other embodiments provide mediation devices to create hybrid networks, e.g., having wireless broadcast networks and 3G networks.

IMS Network with Dynamic Call Models that are a Function of the User

Figure 4:
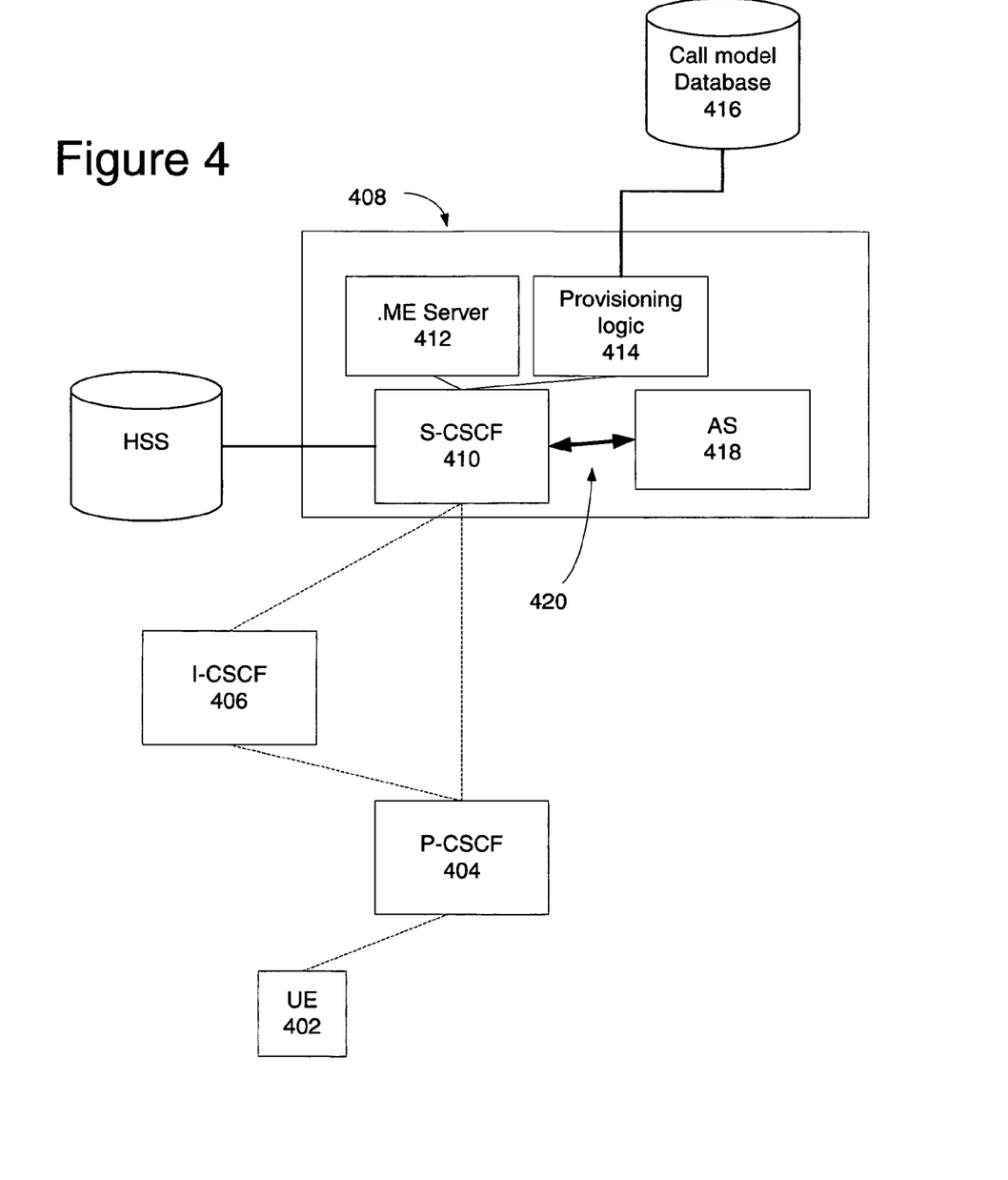
FIG. 4 depicts a certain embodiment of the invention

FIG. 4 depicts relevant portions of an IMS network according to preferred embodiments of the invention. The relevant portions include a UE 402, a P-CSCF 404, an I-CSCF 406, a serving node 408, an HSS, and a call model database 416.

The UE, P-CSCF 404, I-CSCF 406, and HSS are essentially conventional, though the content of the HSS is not, as described below. However, in certain embodiments, discussed below, the UE may have unconventional agent logic. All of these entities communicate using known and defined signaling protocols.

The serving node 408, in preferred embodiments, includes S-CSCF logic 410 that is largely conventional though it includes certain modifications, discussed below. The serving node 408 also includes ME server logic 412 (more below) to store users' dynamic network topologies and other information, and provisioning logic 414 more below. (Alternatively, the ME server logic and the provisioning logic may each be a separate physical entity like an AS.) The ME server and provisioning logic essentially are co-located special purpose servers within node 408. The serving node 408, and particularly provisioning logic 414, communicates with a call model database 416. This database 416 (not the HSS as is the conventional case) is used to provide the call model information for a given user (more below).

Though not shown in FIG. 4, the serving node 408 communicates with application servers (ASs) that include service logic for various services, e.g., voice mail, push-to-talk, etc. The UEs use predefined codes within service requests to identify the service of interest and/or these services can be triggered in known specified ways via SPTs (as is the conventional case).

Figure 5:
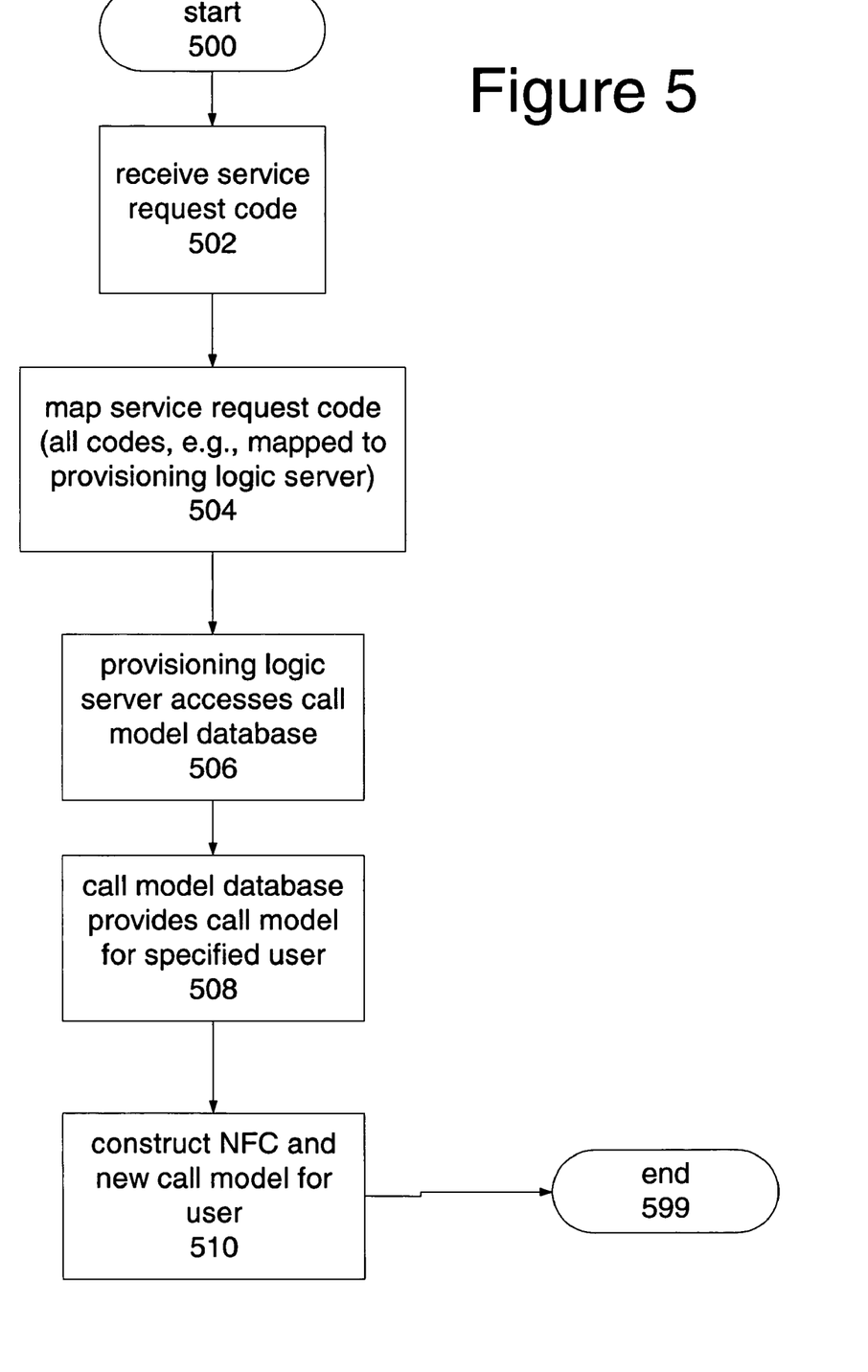
FIG. 5 depicts logic for providing per user (or group) call models according to a certain embodiment of the invention.

FIG. 5 depicts the logic flow for provisioning a S-CSCF with distinct call models for each user. Under preferred embodiments, the HSS provides initial filter codes (IFC) during UE registration (as is the conventional case). However, under certain embodiments of the invention, this IFC is programmed in an unusual way. All the service point triggers (SPTs) for each service are mapped to provisioning logic 414 (i.e., not to ASs corresponding to the actual service codes as is the conventional case.)

The logic flow starts in 500 and proceeds to 502 in which the first service request is received after registration. Because of the default IFC, this service request will not trigger an AS corresponding to that service, and instead will trigger activation 504 of the provisioning logic 414. The provisioning logic 414 will then access 506 the call model database 416. One of the input parameters will identify the user. The call model database 416 will retrieve a call model for that particular user. This call model will include the AS identifiers for the various services for that user. The database 416 will provide 508 the call model information to the provisioning logic 414 which in turn will provide it to the S-CSCF logic 410 within serving node 408. The S-CSCF 410 will construct a new set of filter codes, i.e., NFC, and thus a new call model, for that user (and will trigger the service requested initially using the NFC). The NFC will have SPTs identifying the corresponding ASs. This approach allows for dynamic construction of the NFCs (e.g., post registration) and allows the call model (e.g., NFC with associated SPTs) to be constructed uniquely for each user.

The above logic allows each user to have a call model and NFC that can differ from all other call models served by that S-CSCF. This functionality may be used in many ways. For example, the call model database may be programmed so that users are grouped according to MVNOs or VSOs. In this manner, the various ASs in the NFCs correspond to the particular MVNOs or VSOs, thus allowing each MVNO to provide a unique and distinct service experience, not just different branding and billing. For example, a first user may have a NFC that points to a given AS when accessing voice mail, and a second user (having a different MVNO) can point to a different AS when accessing voice mail. Even though voice mail for both users will have the same service code in their respective service requests, the codes will trigger different ASs and different service logic. Thus, the service experience may be made distinct among MVNOs or VSOs operating on the same IMS infrastructure.

Likewise, a given network operator may use this feature to group its users and distinguish their service experience. That is, the segmentation of the ASs, and in effect the segmentation of the IMS control plane, need not be along MVNO boundaries. Instead the segmentation can be along any boundaries that the network operator desires.

This form of per user call model customization, in which different users may invoke different service logic functionality for the same given service request, is not provided in a conventional IMS network. In conventional IMS arrangements, the HSS provides static call models at UE registration. Each user gets the same ASs within their IFC and thus the same service experience (for services they are authorized to use). Moreover, the above approach allows for full portability of call models. No matter where a UE exists in the IMS network, that UE's call model may be constructed and used for that UE's service experience.

Figure 6:
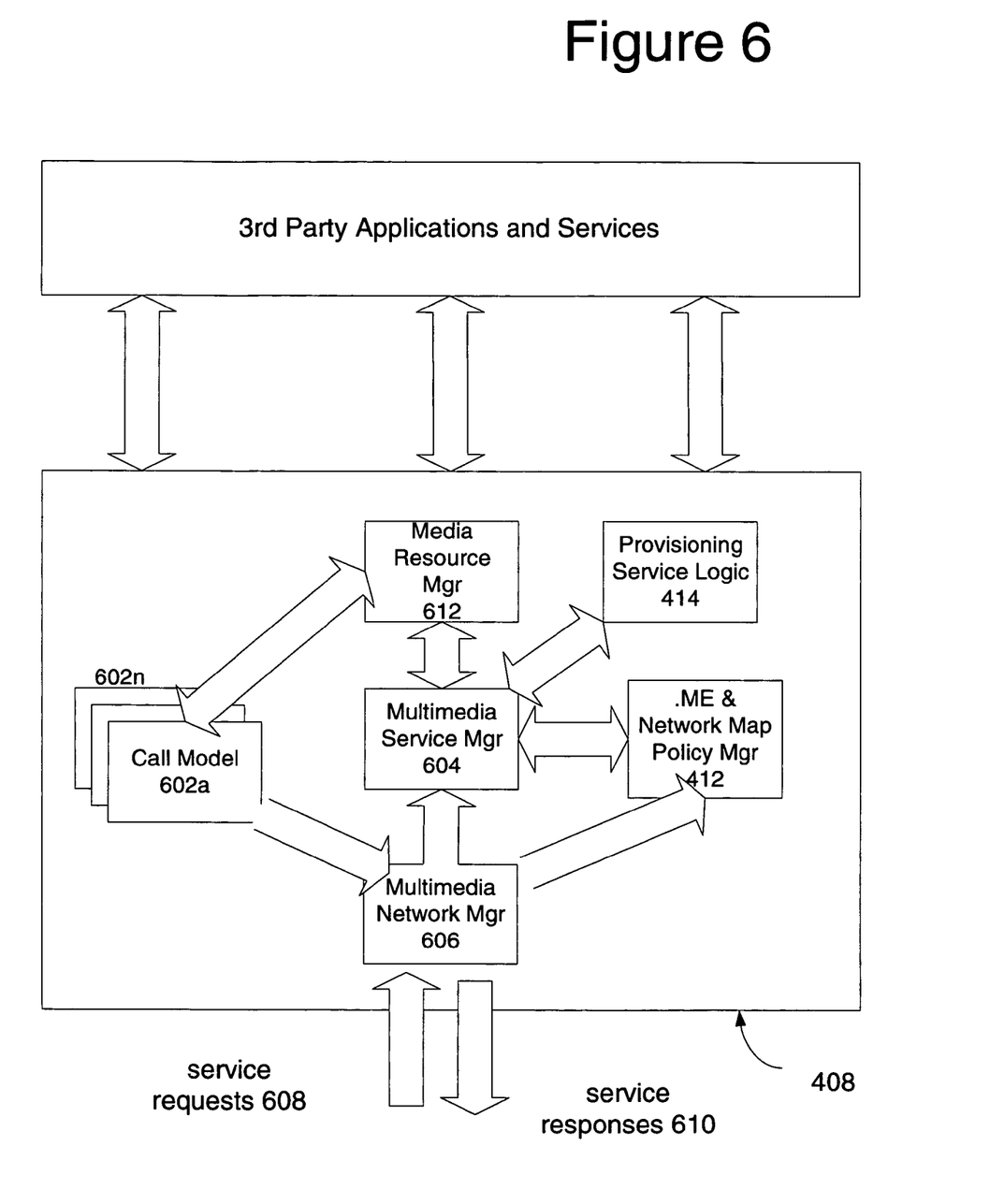
FIG. 6 depicts internal architecture of a certain embodiment of the invention

FIG. 6 depicts serving node 408 once multiple UEs have registered and been provisioned with their corresponding call models 602a... n. Note, the different call models can point to different ASs for a given service, and they are not merely multiple instances of the same IFC/call model. Multimedia network manager 606 receives service requests 608 from the IMS network and provides service responses 610 to the IMS network. It also routes received requests to the appropriate internal entities as shown. ME server logic and Network Map policy manager 412 is responsible for receiving information (more below) indicating that the user's UE environment has changed with new capabilities or devices, and for building information structures and models to reflect these capabilities. In certain embodiments it also includes logic to implement specified policies on whether and how to utilize such capabilities. Provisioned Service logic 414 is responsible for interacting with external or internal databases (e.g., database 416 of FIG. 4). Media resource manager 612 is responsible for managing other resources (e.g., transcoders) that may be involved with a given service. Multimedia service manager 604 is responsible for receiving requests from network manager 606 and for interacting with the other components to construct and build the per-user call model 602. In simple cases this may involve creating call models with the help of the provisioning logic 414 and call model database 416. In other cases the call model construction will be dynamic (more below) using new devices and capabilities (as well as associated policies), and in these instances the manager 604 will involve ME logic 412 and media resource manager 612.

IMS Network that Avoids or Minimizes Stateful Connections between AS and S-CSCF

The above architecture and methods, besides providing the ability to facilitate MVNOs or VSOs with distinctive service logic (i.e., same service requests being handled by distinctive service logic and experience), may be used to provide additional advantages. For example, the approach allows individual MVNO control of service logic that turns stateful inter-domain connections to intra-domain connections, thereby reducing cost and operational complexity.

Typically, the link between a S-CSCF and an application server (see FIG. 1) needs to be a stateful connection. This connection is not without cost. It utilizes resources on the S-CSCF and may also impose costs from providers and services for such a link.

Under certain embodiments, a server node 408 is constructed so that distinctive service logic and corresponding ASs 418 are co-located with the S-CSCF logic 410, either in the same location or perhaps even in the same processor complex. By co-locating the S-CSCF and the AS, the service requests will eventually get sent to the co-located S-CSCF. Because of the connection endpoints' proximity, connection 420 between S-CSCF and the relevant AS will be relatively costless (in terms of hardware, software and avoidance of a link service provider). This may be particularly helpful in cases where the AS was in a MVNO domain and the S-CSCF was in a network-provider domain. However, the technique is helpful in other contexts as well, including those in which the AS and the S-CSCF were operated and managed by the same entity.

Two important consequences follow from the inclusion of S-CSCF functionality within the serving node 408. First, the service logic that executes in the S-CSCF is controlled by the MVNO. Second, the connections between the S-CSCF and the various application servers are within the serving node 408, i.e., limited to a single domain, and are no longer constrained to be across different domains.

Call Model as a Function of UE Environment

The context of an end user may change. For example, as a user roams his or her context may change. Alternatively, even in non-roaming situations, the user context may change as new devices and capabilities emerge or become activated.

At any given moment in time the user may be in close proximity to any number of devices that are capable of acting as a UE for a certain service (application). For example, the user may be near a TV that could be used to display multimedia content. By way of another example, the user may be in close proximity to a personal computer that could be used to receive multimedia information from a network connection, provided network connectivity and authorization to use such a device in this manner could be obtained.

According to certain embodiments, a roaming user may discover (directly or indirectly) several kinds of information and invoke several kinds of corresponding relevant policies to consider when and how to use such capabilities and devices:

1. New devices that could be used to receive multimedia information
2. New network connections that terminate and emanate from such devices
3. New device capabilities
4. Policies that govern use of newly discovered devices and new network connections
5. Policies that are implemented by the service provider that control what devices could be used for which type of services under what sort of conditions An increasing number of mobile handsets support short-range wireless technologies such as Bluetooth and Wi-Fi. According to certain embodiments, a "dynamic profile" is constructed, in part, by logic that executes in the handset. This logic may be executed continuously, periodically at some network determined time interval, or on demand when the user requests a particular service. When executed, the logic senses (or otherwise discovers) the presence of associated devices in the immediate vicinity of the handset using a short-range wireless technology such as Wi-Fi. Associated devices may announce their presence by a variety of means such as but not limited to:

1. Universal Plug and Play Devices (UPnP)
2. Jini discoverable devices
3. RFID devices
4. Bluetooth enabled devices Any method of broadcasting the capability of devices can be used. The sensing logic in the handset receives such broadcast information and assembles it to construct a dynamic profile of the user's immediate context. Since this context changes as the user roams, the dynamic profile changes to reflect the current vicinity of the handset. The dynamic profile is communicated to the serving node 408. For example, this information may be communicated as parameters (e.g., by overloading information elements [IEs] of SDP protocol messages) in conjunction with a special service request dedicated to communicating potential UE devices.

A Personal Agent (PA) (not shown) executes in the UE (handset) and includes the sensing logic to discover such other potential UEs or associated devices (more below). The dynamic profile of the user's immediate environment is communicated to the ME logic 412. This is done by having the ME server invoked in response to the special service request from the UE for communicating such discovered devices and capabilities. The ME service will construct topologies and maps to identify the potential UEs, other networks, etc., to reflect the new devices and capabilities discovered or sensed in the UE's vicinity that could potentially be used by a given user.

In certain embodiments, the static user profile downloaded by the HSS into the S-CSCF at registration time is provisioned by the network operator to contain the address of the ME server. Thus, every communication of the dynamic profile originating from the UE and received by the S-CSCF causes a SPT trigger to fire, and control is transferred to the corresponding ME server. In this fashion the serving node 408 and more particularly the ME server 412 becomes aware of the immediate context of the UE (handset).

Once the ME server has the information in the dynamic profile, it consults a database of policies described by the service operator. These policy descriptions may be co-located with the ME logic and even the S-CSCF logic (see, e.g., FIG. 6). These policies prescribe certain actions that depend on the data contained in the dynamic profile. For example, a policy can require that if the UE sensing logic discovers a Wi-Fi connection in its immediate vicinity, then this discovered network should be used for originating session requests. Specific logic associated with this policy is then executed to send directions to the PA to enforce this directive at the UE level. When evoked, the policy decision only changes the behavior of those UEs that come under the control of a particular MVNO. Another MVNO may, in general, have a completely different set of policies. Policies may not only be specified by the MVNO but also by end users, provided the network interfaces allow the users to specify actions that should be taken when certain events and situations are discovered in the UE's environment. Such user specified policies may over-ride policies specified by the MVNO.

Figure 7:
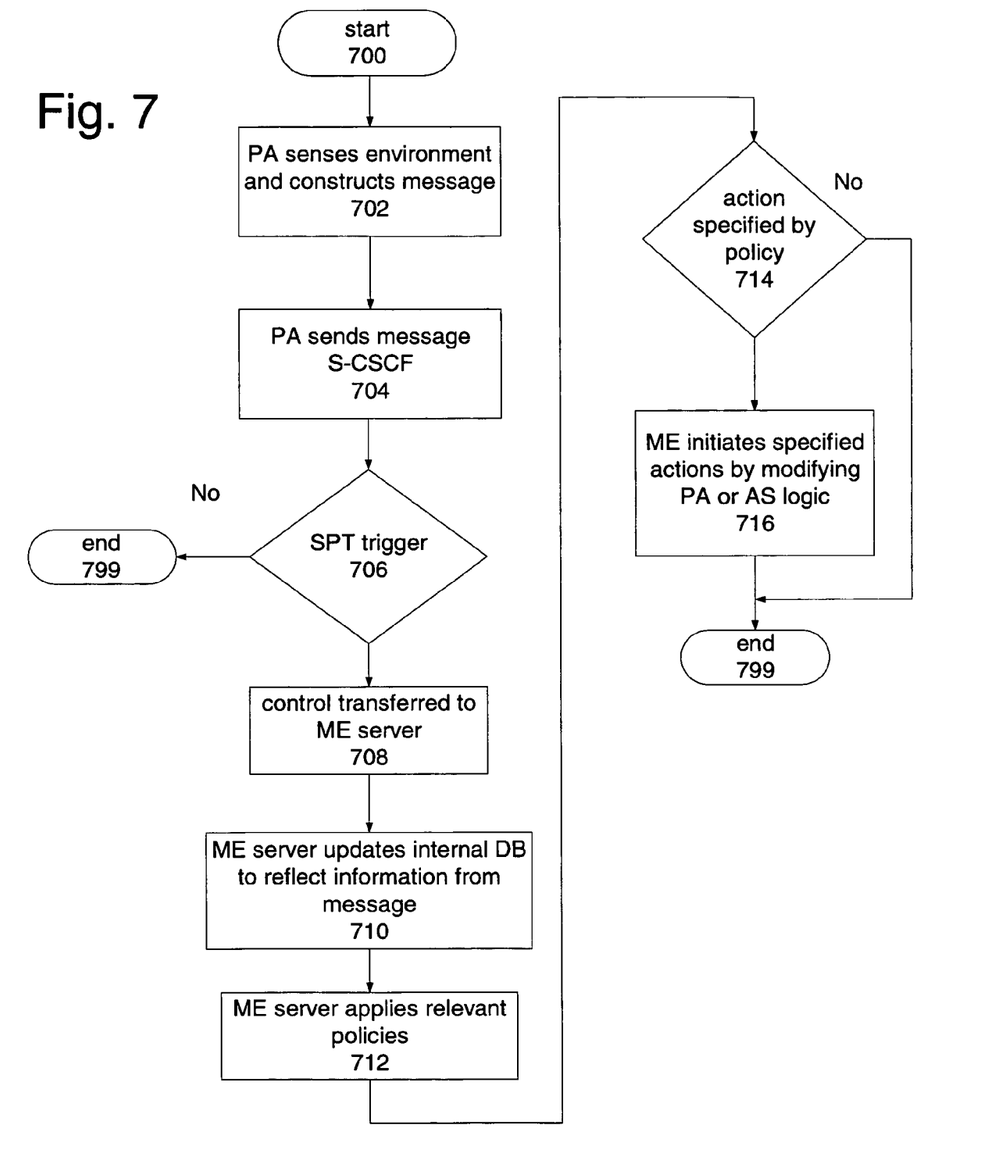
FIG. 7 depicts logic for providing dynamic call models according to a certain embodiment of the invention.

FIG. 7 is a flow diagram illustrating the customization of service logic to conform to user or MVNO policies. The logic starts in step 700 and proceeds to step 702 in which the PA logic on the UE discovers or senses its immediate environment or context and constructs a message specifying this dynamic context. This message may include information about, new devices that could be used to receive multimedia information, new network connections that terminate and emanate from such devices, and new device capabilities. In step 704 the PA on the UE sends the message to S-CSCF. In step 706 the message either causes an SPT trigger or it does not, depending on how the IFC or NFC is constructed. For the relevant embodiment, it causes such a triggering event and the logic proceeds to step 708. In step 708, control is transferred to the ME server. In step 710 the ME server updates its internal database to reflect the information communicated in the message from the PA in the UE. The ME server, in step 712, then applies any relevant policies that will determine, for example, whether and how to utilize newly discovered devices and capabilities. Then, in step 714, the logic determines whether any action is specified by the policy. If so, in step 716 the specified action is initiated. This can be done by customizing the PA logic on the UE. It may also be done by customizing the AS logic. For example, in a typical embodiment, S-CSCF logic will be modified to initiate or trigger the specified actions after the ME logic has updated its models accordingly and perhaps after a new dynamic call model is instructed for that particular user to reflect new devices and capabilities.

In an alternative embodiment the S-CSCF logic 410 is not hosted within a serving node 408 as shown in FIG. 4; that is, the S-CSCF 410 is not constrained to be hosted by the MVNO domain. In this embodiment the S-CSCF remains hosted in the IMS serving domain of the network operator and is a separate entity, as in a conventional IMS network, and the ME server and provisioning logic are configured as ASs, though, as explained above, they do not provide conventional IMS services and instead are used in the construction of dynamic call models.

Figure 8:
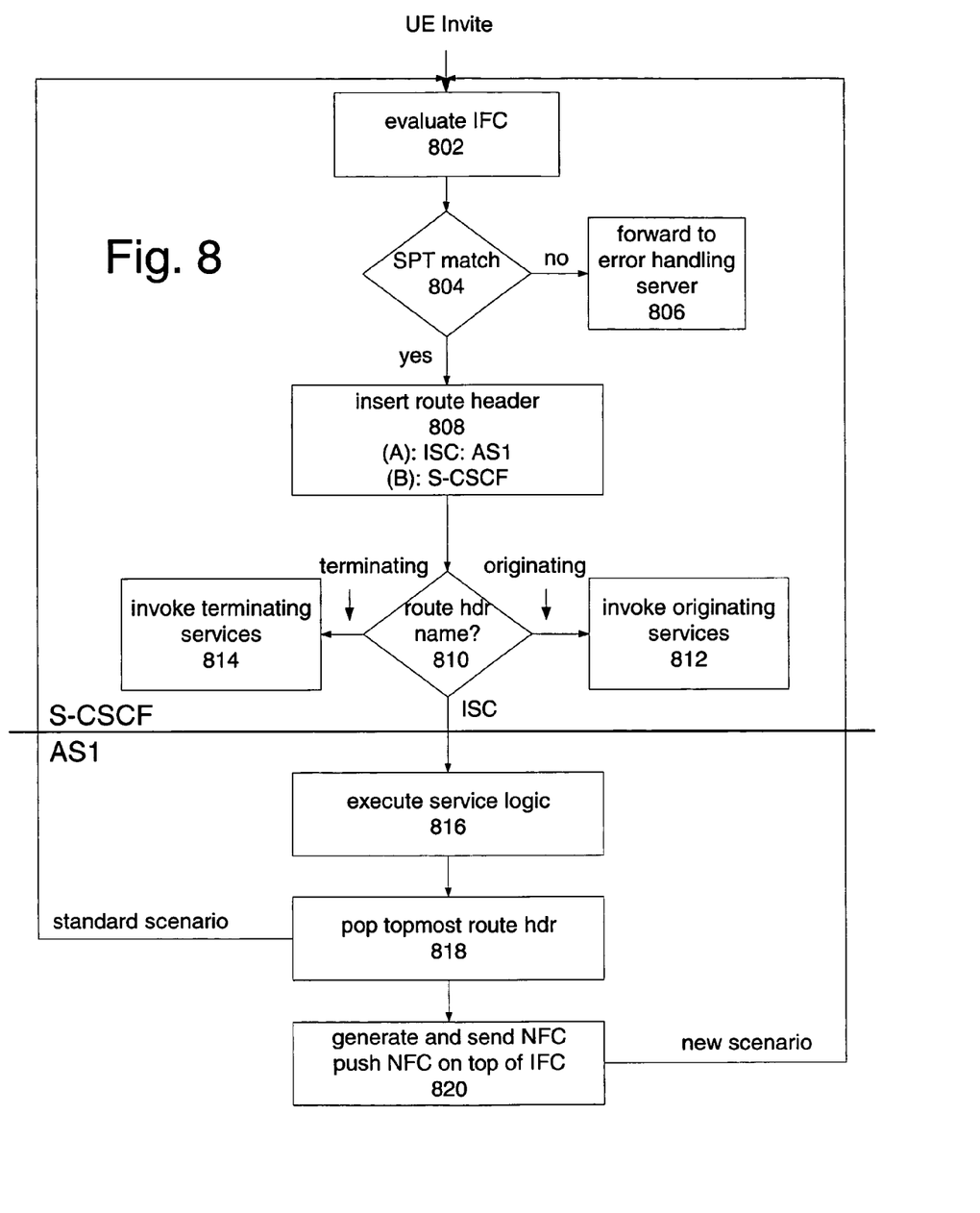
FIG. 8 is a flow diagram illustrating the operation of a certain embodiment of the invention in which the S-CSCF is not hosted within a server node.

FIG. 8 is a flow diagram illustrating the operation of the IMS system in which the S-CSCF is not hosted within the serving node 408. The figure describes the actions taken by the CSCF and the Application Server AS. As is well known to practitioners of the art, and is briefly described above, the S-CSCF consults the callee's service profile and obtains the initial filter codes from the HSS at registration time. When a service request is generated by the UE, the request is routed to the terminating S-CSCF (T-SCSCF). The T-SCSCF evaluates 802 the IFCs and asks if there is an SPT match 804. If no match is found, i.e., no application server can be found corresponding to the SPT, it invokes 806 an error handling routine, involving an error handling server. If a SPT match is found 804, under normal IMS operations, the CSCF would have transferred control to the corresponding Application Server, say AS1. In the approach described herein, the CSCF inserts a new "route header" and can determine whether "originating" or "terminating" services are to be invoked for this request. FIG. 8 shows control now transferring to the Application server AS1 using ISC protocol. AS1 executes the service logic corresponding to the request and, under normal IMS operations, would have returned control to the CSCF from whence it had been invoked 808. In the approach described herein, a new set of NFCs are generated and pushed on to the old IFC, and then control is returned back to the CSCF. In summary, the methods described herein extend this standard procedure to handle a dynamic situation by generating a new set of filter codes (NFC) that are communicated to the S-CSCF (either by an in-band or out-of-band communication channel), as follows. If an SPT match is found 804, a new route header is inserted 808. The route header name is then checked 810 to determine which of originating or terminating services are to be invoked. Control is then transferred to the Application Server that was specified in 808, namely AS1. In 816 the service logic is executed by AS1. Once execution of the service request is completed, the top-most header (inserted in step 808) and sent to AS1 is popped 818, and a new set of filter codes (NFCs) are generated 820. Upon receiving the NFCs, the S-CSCF "pushes" the NFCs on top of the IFC stack 820. As a result, the NFCs are now executed according to the standard execution logic of the S-CSCF. When execution of the NFCs terminates, the execution stack of the S-CSCF reverts 812 to the original contents of the IFC stack that had been pushed down by the, now "popped," NFCs. The NFCs direct the S-CSCF to invoke a new set of application servers (AS2, AS3, etc.) that contain MVNO-specific logic that is executed on behalf of the MVNO. Upon termination of this execution, control is returned by the application server to the S-CSCF. In this manner the S-CSCF is directed to a new set of application servers specified by the MVNO in the NFC. These new application servers may contain service logic that is executed to provide customization to the service logic on behalf of the MVNO.

Mediation System or Device for Hybrid Networks having 3G and Wireless Broadcast Networks In yet another embodiment, the concept of MVNO-customized logic may be applied to so-called hybrid networks. In general a hybrid network is a combination of two or more individual networks. Examples of digital broadcast networks for joint use are DVB-H (Digital Video Broadcast—Handheld), and Media FLO (Forward Link Only). In a hybrid network, the broadcast network provides a high capacity but one-way transport for multimedia (video) traffic, while the UMTS (Universal Mobile Telecommunications System) network (or other network) may provide lower capacity two-way transport for interactive services. In such hybrid networks, the UMTS network is used for control and signaling purposes for the services offered by the broadcast component network. In this fashion, the UMTS network supplements the digital broadcast network by providing a control network or a network for user interactivity functions. Conversely, the broadcast network may supplement a UMTS (or other) network by providing certain broadcast functionality.

Figure 9:
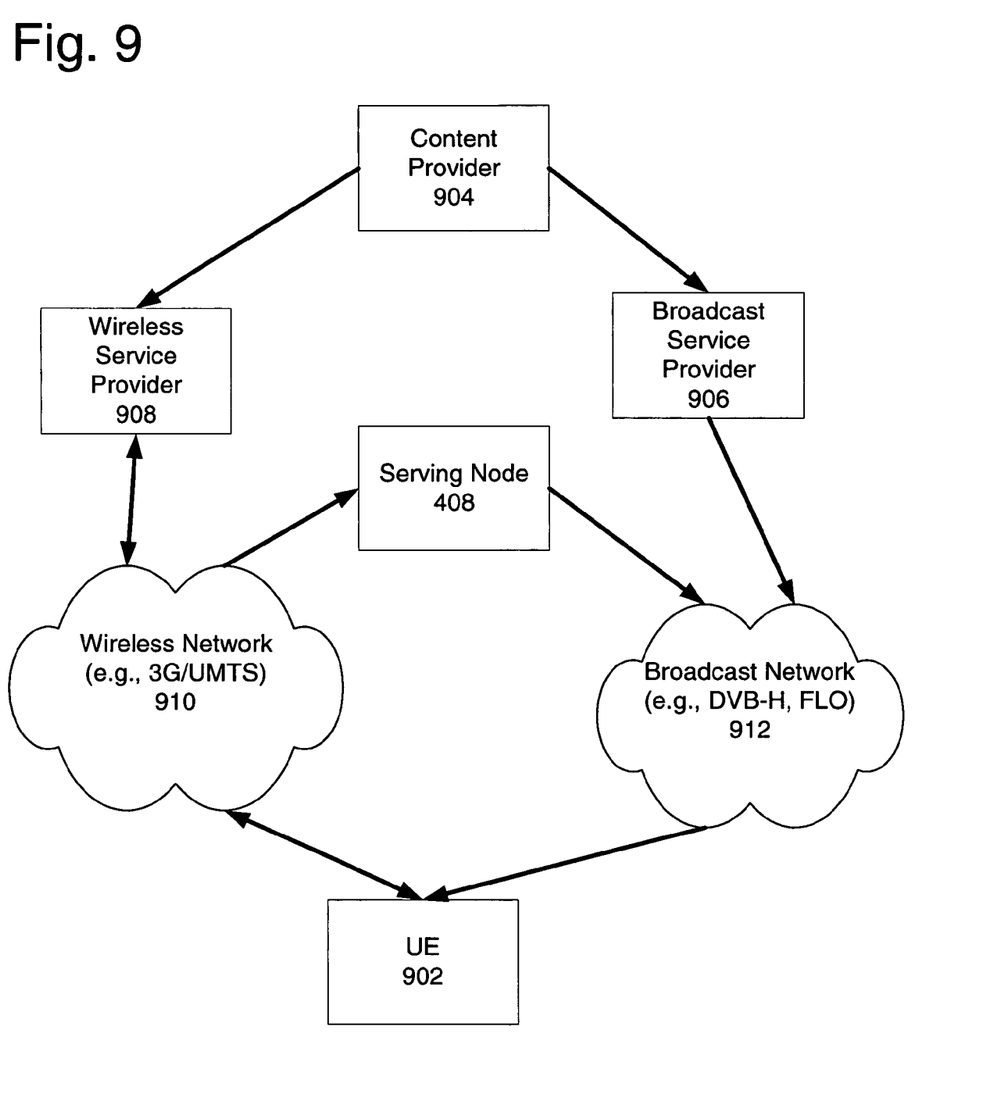
FIG. 9 illustrates a hybrid network with a server node as a mediation device according to a certain embodiment of the invention.

FIG. 9 is a flow diagram illustrating the use of customized MVNO logic with hybrid networks. Service to the handset UE 902 may be provided by a content provider 904, broadcast provider 906, or wireless provider 908. Any of these three service providers may act as an MVNO by using one or more components of the hybrid network without owning that component. In such arrangements a mediation entity (e.g., the serving node 408 above) can allow interactions between the 3G/UMTS network component 910 and the broadcast component 912. The handset UE 902 sends service requests using the 3G (IMS) network 910, which are conveyed to a control element, which could be the serving node 408. The control element 408 may computationally decide which component network to use to deliver the service based on a computation of a cost function, for example, within the policy logic as described above. The result of the cost function computation decides whether to use the broadcast or the 3G/UMTS network to deliver the service. The control element then directs the corresponding network elements in the chosen transport network to carry the service.

Since the control plane of the 3G/UMTS network 910 consists of the various CSCF elements (as described above), there exists a need to connect the CSCF control elements to the control and transport elements of the Broadcast network 912. As has been described earlier such a connection can be achieved by ensuring that the S-CSCF be connected to an Application Server (AS) that serves as a control element of the Broadcast network. Consistently with the description above, the broadcast network may be effectively triggered or invoked as if it were an AS, or vice versa. (In some embodiments, it may be necessary to use proxy logic to transform and convert protocols or messages.)

Moreover, the IFCs that are loaded into the S-CSCF at UE registration time are provisioned to cause the execution of the cost function for service requests. This cost function could, in general, be executed on a designated application server, say AS2. As described earlier, the S-CSCF transfers control to the designated AS2 upon execution of the IFC. AS2 now computes the cost function and chooses one of the component networks to deliver the service. This choice results in constructing a new set of filter codes NFC that are loaded into the S-CSCF, as described above for the case where the S-CSCF is not hosted within the serving node 408. Now, when the S-CSCF executes the NFC, control is transferred to another application server, say AS3, as per the instructions contained in the NFC. AS3 may now be assumed to be the server that controls the network elements of the chosen network component. Hence, when AS3 executes its service logic the corresponding service is delivered to the handset. The steps in this sequence may be summarized as follows:

1. Receive service request from UE; convey it to S-CSCF
2. Execute filter code stack (containing IFC) in S-CSCF
3. Based on service request, control transferred to server AS1
4. AS1 executes cost function.
5. Cost function determines which network to deliver service: broadcast or 3G.
6. AS1 constructs NFC reflecting choice based on cost function.
7. NFC transmitted back to S-CSCF and pushed onto execution stack
8. Control transferred back to S-CSCF.
9. Execute filter code stack.
10. Control transferred to network application server acting as control element for chosen network component, say AS3.
11. AS3 executes its service logic, causing service delivery to handset.
12. Upon termination of service, control is returned back to S-CSCF by AS3.

This sequence is implemented in the serving node 408 as described herein. In particular, the S-CSCF 410 along with the needed application servers may be provided in the serving node 408 architecture described above. The connection between the S-CSCF and the application servers for transferring the NFC may be provided by the serving node 408. In other words, the serving node 408 as described herein may serve as a mediation element between the broadcast and 3G/UMTS component networks in a hybrid network.

Uplink or interactivity services (e.g., when supplementing a broadcast network) may be implemented as an AS that the serving node 408 invokes. Likewise, when supplementing a UMTS network, a broadcast network server may be implemented or invoked as if it were an AS. Moreover, MVNOs or VSOs may be associated with the various entities.

A single serving node 408 may not be able to handle the load and volume of handsets. Thus, several serving nodes 408 may be grouped together with internal communication facilities to create a server farm of serving nodes, called a server node complex. Each MVNO is typically identified with a server node complex.

It will be further appreciated that the scope of the present invention is not limited to the above-described embodiments but rather is defined by the appended claims, and that these claims will encompass modifications and improvements to what has been described.

What is claimed:

1. A system for provisioning dynamic call models within an IP Multimedia Subsystem (IMS) network having a serving call state control function (S-CSCF) for providing session control for user endpoint (UE) devices, said system comprising:

at least one user endpoint device (UE) with agent logic to express dynamic context of the UE in a message and to send said dynamic context message to a S-CSCF, wherein said dynamic context includes one or more other devices that are located in the vicinity of the UE and could be used as UEs or associated devices, network connections that terminate or emanate from said at least one of said UE and said other devices that could be used as UEs or associated devices, and capabilities of said other devices that could be used as UEs or associated devices; and S-CSCF logic to receive said dynamic context message from the UE and to construct a dynamic call model in response thereto, said dynamic call model having filter codes to associate IMS service codes with application servers (ASs) in communication with the IMS network, said ASs being responsive to service point triggers (SPTs) and at least one AS having service logic for a corresponding IMS service code to provide a service to the user, utilizing at least one of said other device expressed in the dynamic context message, said network connections that terminate or emanate from the other device expressed in the dynamic context message, and said capabilities of the other device expressed in the dynamic context message.

2. The system of claim 1 wherein the logic to construct a dynamic call model includes logic to consult and use specified service policies in constructing said dynamic call models.

3. The system of claim 2 wherein the specified service policies govern use of newly discovered devices and new network connections.

4. The system of claim 2 wherein the specified service policies are specified and implemented by a service provider to control which devices may be used for which type of services for specified conditions.

5. The system of claim 2 wherein the specified service policies are user-specified.

6. The system of claim 2 wherein the specified service policies are specified by a network administrator.

7. The system of claim 1 further including logic to receive the context message and logic to build a data structure to reflect the dynamic context for the UE.

8. The system of claim 7 wherein the logic to receive and to build is contained in the S-CSCF.

9. The system of claim 7 wherein the logic to build said data structure is contained in a dedicated AS that is invoked by the S-CSCF when the S-CSCF receives the context message.

10. The system of claim 1 wherein the UE includes logic to electronically sense the dynamic context.

11. The system of claim 10 wherein the UE includes Universal Plug and Play Devices (UPnP) logic to electronically sense at least a subset of components in the dynamic context of the UE.

12. The system of claim 10 wherein the UE includes Jini logic to electronically sense at least a subset of components in the dynamic context of the UE.

13. The system of claim 10 wherein the UE includes RFID logic to electronically sense at least a subset of components in the dynamic context of the UE.

14. The system of claim 10 wherein the UE includes Bluetooth logic to electronically sense at least a subset of components in the dynamic context of the UE.

15. The system of claim 10 wherein the electronic sensing logic operates continuously.

16. The system of claim 10 wherein the electronic sensing logic operates periodically or at specified times.

17. The system of claim 10 wherein the electronic sensing logic operates on demand.

18. The system of claim 1 wherein the dynamic context message from the UE is issued post registration of the UE.

19. The system of claim 1 wherein the logic to construct a dynamic call model builds a new call model to replace a prior call model for a user.

20. The system of claim 1 wherein the logic to construct a dynamic call model builds new filter codes and pushes said new filter codes on top of the prior call model for a user.

21. A method of provisioning dynamic call models within an IP Multimedia Subsystem (IMS) network having a serving call state control function (S-CSCF) for providing session control for user endpoint (UE) devices, said method comprising:

expressing a dynamic context of at least one user endpoint device (UE) in a message, wherein said dynamic context includes one or more other devices that that are located in the vicinity of the UE and could be used as UEs or associated devices, network connections that terminate or emanate from at least one of said UE and said other devices and could be used as UEs or associated devices, and capabilities of said other devices that could be used as UEs or associated devices;

sending said dynamic context message to a S-CSCF; and provisioning the S-CSCF logic to receive said context message from the UE and construct dynamic call model in response thereto, said dynamic call model having filter codes to associate IMS service codes with application servers (ASs) in communication with the IMS network, said ASs being responsive to service point triggers (SPTs) and at least one AS having service logic for a corresponding IMS service code to provide a service to the user, utilizing at least one of said other device expressed in the dynamic context message, said network connections that terminate or emanate from the other device expressed in the dynamic context message, and said capabilities of the other device expressed in the dynamic context message.

22. The method of claim 1 wherein, when constructing a dynamic call model, specified service policies are consulted and used to construct said dynamic call models.

23. The method of claim 22 wherein the specified service policies govern use of newly discovered devices and new network connections.

24. The method of claim 22 wherein the specified service policies are specified and implemented by a service provider to control which devices may be used for which type of services for specified conditions.

25. The method of claim 22 wherein the specified service policies are user-specified.

26. The method of claim 22 wherein the specified service policies are specified by a network administrator.

27. The method of claim 21 further including building a data structure to reflect the dynamic context for the UE.

28. The method of claim 27 wherein logic in the S-CSCF builds the data structure.

29. The method of claim 27 wherein a dedicated AS that is invoked by the S-CSCF when the S-CSCF receives the context message builds the data structure.

30. The method of claim 21 wherein the UE includes logic to electronically sense the dynamic context.

31. The method of claim 30 wherein the UE uses Universal Plug and Play Devices (UPnP) protocol to electronically sense at least a subset of components in the dynamic context of the UE.

32. The method of claim 30 wherein the UE uses Jini protocol to electronically sense at least a subset of components in the dynamic context of the UE.

33. The method of claim 30 wherein the UE uses RFID protocol to electronically sense at least a subset of components in the dynamic context of the UE.

34. The method of claim 30 wherein the UE uses Bluetooth protocol to electronically sense at least a subset of components in the dynamic context of the UE.

35. The method of claim 30 wherein the electronic sensing operates continuously.

36. The method of claim 30 wherein the electronic sensing operates periodically or at specified times.

37. The method of claim 30 wherein the electronic sensing operates on demand.

38. The method of claim 21 wherein the dynamic context message from the UE is issued post registration of the UE.

39. The method of claim 21 wherein, when constructing a dynamic call model, a new call model is built to replace a prior call model for a user.

40. The method of claim 21 wherein, when constructing a dynamic call model, new filter codes are built and pushed on top of the prior call model for a user.

* * * * *